United States Patent Office 2,943,323
Patented June 28, 1960

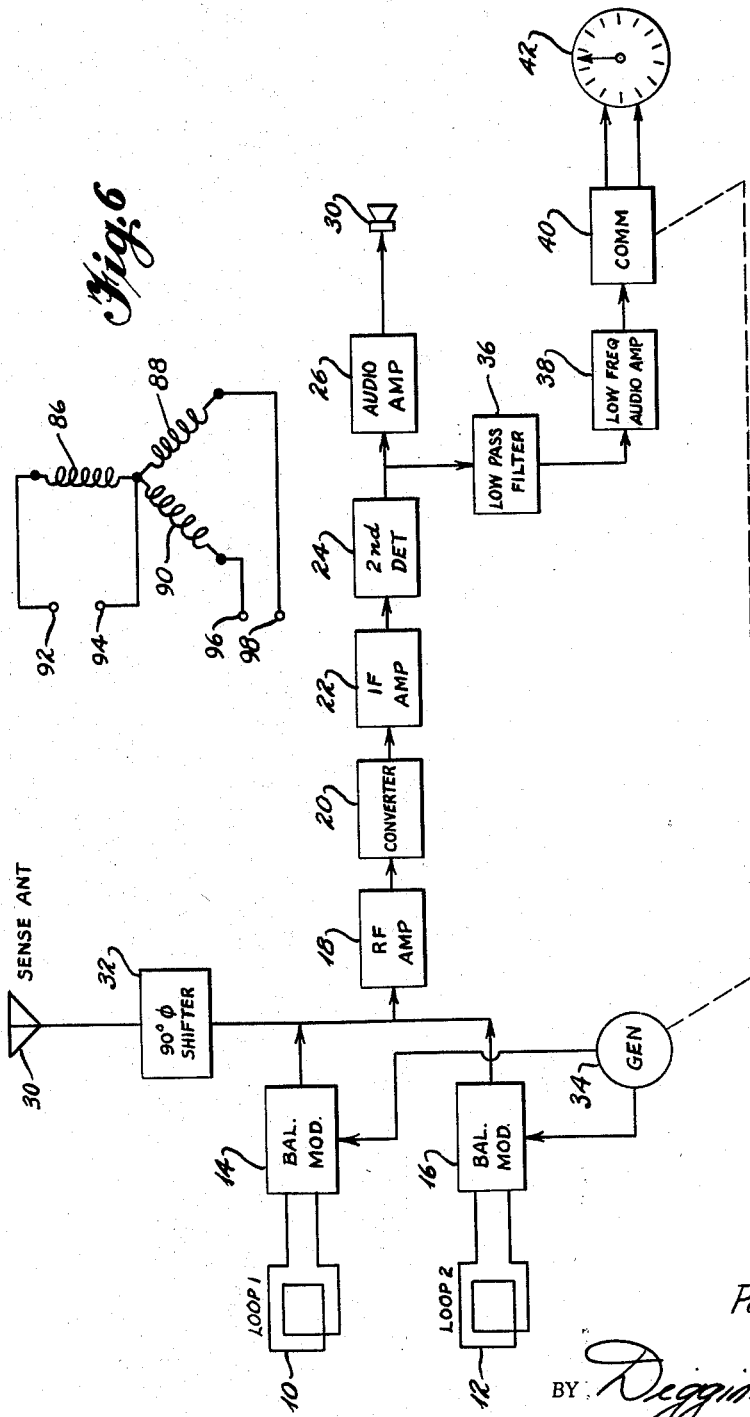

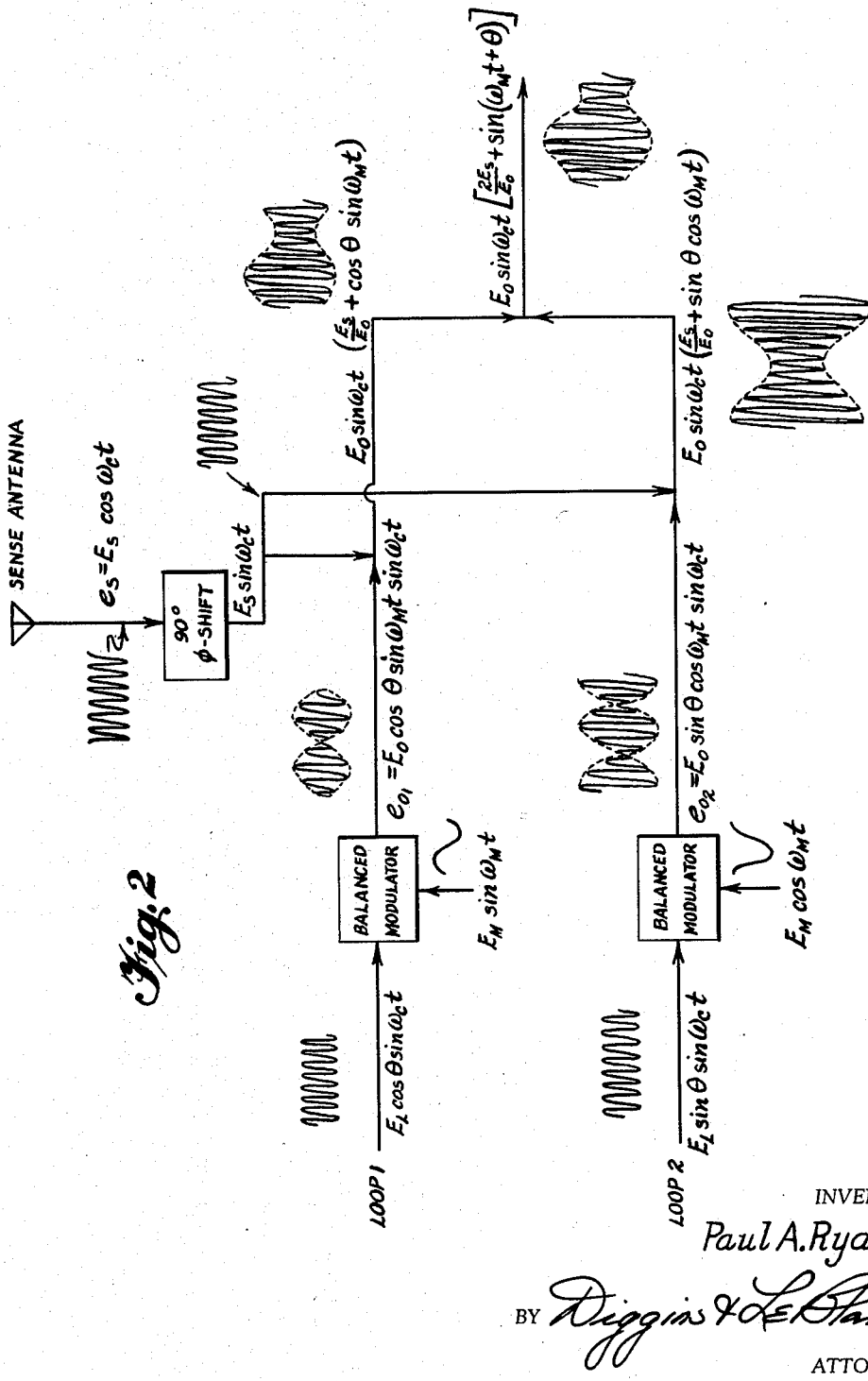

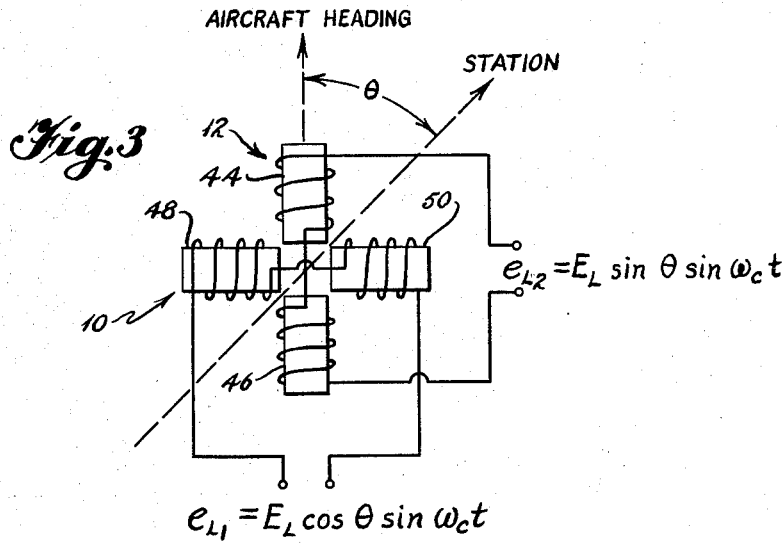
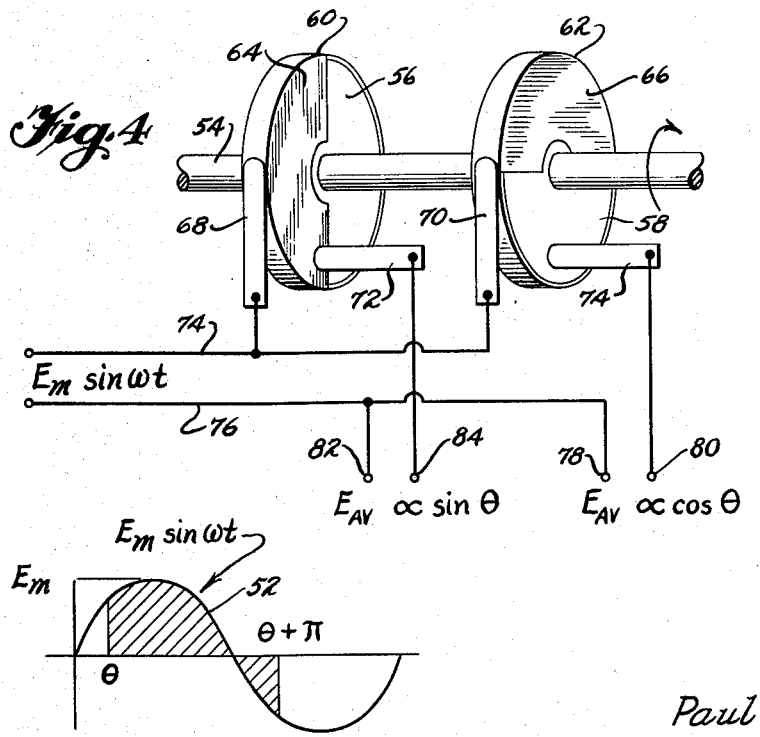

2,943,323
AUTOMATIC DIRECTION FINDING DEVICE FOR AIRCRAFT

Paul A. Ryan, Columbus, Ohio, assignor to International Research & Development Corp., Columbus, Ohio, a corporation of Ohio Filed Sept. 3, 1957, Ser. No. 681,741

4 Claims. (Cl. 343—120)

This invention relates to radio guidance systems for mobile craft and more particularly relates to an automatic direction finding device for aircraft.

The aircraft automatic direction finding systems which are in use today generally utilize a rotating loop antenna. When a radio station is tuned, the loop is automatically rotated by an electronic and mechanical system until it arrives at a fixed positional relationship with respect to the station being received. That is to say, as long as the system is operating, the angular relationship between the plane of the loop and the line from the loop to the station to which it is tuned remains constant, so that the loop position is a measure of the angular displacement between the transmitting station and the heading of the aircraft. While such systems operate satisfactorily, the mechanical assembly associated with the movable loop automatic direction finding unit is expensive and is frequently found to be a source of trouble.

According to the present invention, a pair of stationary loops are located in a horizontal plane and are displaced by 90 mechanical degrees. The outputs from these loops are respectively modulated in balanced modulators by low frequency sinusoids 90 degrees apart in phase. The outputs of the balanced modulators are then mixed and fed through a conventional superheterodyne circuit and thence through a low-frequency audio-amplifier which amplifies the modulating signal. This low-frequency modulation signal is then compared in phase with the modulation voltage which was originally introduced into the modulators in a phase sensitive detector, and a 360° meter is used to display the phase difference between the two voltages. This is an indication of the direction of the transmitting station in relation to the heading of the aircraft. This system utilizes a very small antenna and a minimum amount of electronic equipment. The receiver serves the dual purpose of amplifying and detecting or demodulating the modulated signal utilized in the system while simultaneously presenting audio-reception of the transmitting station to which it is tuned. Certain criticalities in adjustment which have been found inherent in other fixed loop automatic direction finding systems are eliminated and stable and reliable operation secured.

It is accordingly a primary object of the present invention to provide an improved automatic direction finding system utilizing a stationary antenna unit.

It is another object of the invention to provide an improved automatic direction finding system which is stable and reliable in operation and which is subject to relatively low original cost and maintenance costs.

It is still another object of the invention to provide an improved automatic direction finding system which is accurate and light in weight so as to be adapted to use on all types of aircraft, including small light aircraft.

These and further objects and advantages of the invention will become more apparent upon reference to the following specification and claims and appended drawings wherein:

Figure 1 is a diagrammatic illustration of the automatic direction finding system of the invention;

Figure 2 is a diagrammatic illustration showing the effect of the modulators and sense antenna signal upon the RF signals from the loop antennas;

Figure 3 is a diagrammatic illustration showing the loop antenna;

Figure 4 is an illustration showing one type of commutator suitable for use in the indicating unit;

Figure 5 is a graphic illustration of the effect of the commutator of Figure 4; and Figure 6 is a diagrammatic illustration of an indicator which may be used.

Referring more particularly to Figure 1 of the drawing, the automatic radio direction finding system of this invention utilizes a pair of loop antennas 10 and 12 oriented at 90 mechanical degrees from one another and lying substantially in the same plane. The signals from these loops are fed to a pair of balanced modulators 14 and 16 of a conventional type. The basic principle in any balanced modulator is to introduce the carrier in such a way that it does not appear at the output, but so that the side bands will. This requirement is satisfied by introducing the low-frequency modulating signal in push-pull and the RF drive in parallel, and connecting the output (plate-circuit) of the tubes in push-pull and this constitutes the preferred circuit of this system. However, balanced modulators can also be connected with the RF drive and low frequency modulating signal input in push-pull and the output in parallel with equal effectiveness. Plate or any type of grid modulation may be employed and, in the specific embodiment of the invention involved, control grid modulation is utilized.

The outputs of the balanced modulators 14 and 16 are mixed and fed to a conventional superheterodyne receiver circuit consisting of an RF amplifier 18, converter 20, IF amplifier 22 and second detector 24. The superheterodyne receiver also possesses an audio stage 26, feeding a speaker 28 for reproducing the intelligence transmitted by the transmitting station. As is well understood by those skilled in the art, a fixed loop system is subject to an inherent ambiguity which may be overcome through the use of an omni-directional sense antenna 30 which is connected to a 90° phase shift network 32 and the output of this network fed to the input of RF amplifier 18. When the RF signal from the sense antenna is mixed with RF signals from the loop antennas in proper phase relationship, it produces a cardioid directional characteristic which eliminates the ambiguity.

The modulating signals supplied to the balanced modulators 14 and 16 are low-frequency signals, preferably audio frequencies in the range of 50–100 c.p.s. These may be derived from any suitable source capable of providing two equal frequency signals in locked phase relationship 90° removed from one another. In Figure 1 this is shown as a generator 34 having a pair of windings arranged 90 mechanical degrees from one another. The output of the second detector 24 is fed to a low pass filter 36 and thence to a low-frequency audio amplifier 38. The output signal from the low frequency audio amplifier 38 is fed to a suitable phase sensitive detector which is shown in Figure 1 as a commutator 40 mechanically coupled to the generator 34 and feeding a 360° phase meter 42, which presents the direction of the transmitting station in relation to the heading of the aircraft.

Referring to Figure 3, the fixed loop antenna utilized in the system of this invention comprises a pair of loops 10 and 12 wound in a split fashion so as to be mountable within a single plane. A generally flat insulating member 44 has one-half of loop 12 wound thereon with the other half of this loop being wound upon a similar insulating core 46. Loop 10 is similarly wound in separate halves about insulating cores 48 and 50. In the specific embodiment shown the center lines of the cores 44 and 46 of loop 12 are aligned with the longitudinal axis of the aircraft and the purpose of the entire system is to provide an accurate indication of the angle between the aircraft heading and a line through the center of the antenna and the transmitter station tuned in by the receiver.

Referring to Figures 1, 2 and 3, the voltage induced in loop 10 by the radiation field of the transmitter (neglecting carrier modulation for the moment) is:

$$E_L \cos \theta \sin \omega_c t \qquad (1)$$

and the induced voltage in the second loop 12 will be:

$$E_L \sin \theta \sin \omega_c t \qquad (2)$$

where $E_L$ is a constant for a given position and $\theta$ is the angle between the station and the aircraft heading.

The signal from each loop antenna is modulated in its respective balanced modulator by a low frequency sinusoid so that the outputs of the balanced modulators have the forms:

$$e_{01} = E_0 \cos \theta \sin \omega_m t \sin \omega_c t$$
$$= \frac{E_0}{2} \cos \theta [\cos (\omega_c - \omega_m)t - \cos (\omega_c + \omega_m)t] \qquad (3)$$

$$e_{02} = E_0 \sin \theta \cos \omega_m t \sin \omega_c t$$
$$= \frac{E_0}{2} \sin \theta [\sin (\omega_c + \omega_m)t + \sin (\omega_c - \omega_m)t] \qquad (4)$$

Where $E_0$ is a constant depending upon the antenna field intensity and circuit parameters, $\omega_m$ is the angular frequency of the low frequency modulation and $\omega_c$ is the carrier frequency. It is to be noted that $e_0$ contains the side band frequencies with the carrier frequency having been suppressed.

When the additional sense signal at the carrier frequency is added to $e_{01}$ and $e_{02}$, the resultant voltages are:

$$E_0 \sin \omega_c t \left( \frac{E_s}{E_0} + \cos \theta \sin \omega_m t \right) \qquad (5)$$

$$E_0 \sin \omega_c t \left( \frac{E_s}{E_0} + \sin \theta \cos \omega_m t \right) \qquad (6)$$

The addition of this sense voltage effects a phase reversal in the modulation envelope when the loop voltage reverses phase. The sense voltage is supplied by an omnidirectional sense antenna consisting of a length of wire mounted on the aircraft frame. The voltage from the sense antenna is shifted in phase by 90° in order to supply the desired phase to the balance modulator output.

The outputs of the two balanced modulators are added to produce the signal voltage $$E_0 \sin \omega_c t \left[ \frac{2E_s}{E_0} + \sin (\omega_m t + \theta) \right] \qquad (7)$$

The relative phase between the modulation of this signal and the low frequency modulation voltage is exactly equal to the angular displacement between the station and heading of the aircraft. Since the output of the balanced modulators contains the station modulation, this signal can be operated on by conventional receiver circuitry and the audio intelligence reproduced in the loud speaker 28. The low frequency modulation produced in the balanced modulators can be effectively filtered from the audio since it represents a single low frequency audio frequency component.

The output of the low frequency audio amplifier 38 is substantially a sinusoid at modulation frequency as represented graphically by the sinusoid 52 in Figure 5. If this sinusoid is sampled in 180° samples, the average voltage of the sample signal may be represented by the following:

$$E_{AVG} = \frac{1}{\pi} \int_\theta^{\theta+\pi} E_m \sin \omega t\, d(\omega t) \qquad (8)$$

If this expression is integrated it can be shown that the average voltage is a function of $\cos \theta$ as represented herewith:

$$E_{AVG} \propto \cos \theta \qquad (9)$$

This sampling can be accomplished in any suitable manner which will be apparent to those skilled in the art, and one example of such a manner is shown in the commutator illustrated in Figure 4. Referring to that figure there is shown a shaft 54 driven in synchronism with the shaft of generator 34. This shaft carries a pair of insulating discs 56 and 58 each having a slip ring 60 and 62 mounted on the periphery thereof. The disc 56 also carries a semi-circular contact plate 64 which is connected to the slip ring 60. Disc 58 carries a similar semi-circular contact 66 connected to the slip ring 62. A pair of brushes 68 and 70 are associated with the slip rings 60 and 62, while a pair of additional brushes 72 and 74 engage the faces of the discs 56 and 58. It will be noted that the contact plate 66 on disc 58 is removed 90° from the contact plate 64 on disc 56.

If now the signal 52 in Figure 5 is fed to lines 74 and 76, it is apparent that an output will appear at terminals 78 and 80 which will constitute 180° samples of the sinusoid 52. It will thus be seen that the output at terminals 78 and 80 will be a function of $\cos \theta$. The output on terminals 82 and 84, while it also constitutes 180° samples of the sinusoid 52, is 90° removed from the samples at terminals 78 and 80 so that it is a function of $\sin \theta$.

If these signals are then fed to an indicating instrument having a pair of stator fields at 90 mechanical degrees from one another, a rotor mounted in such fields will follow the resultant magnetic field to give a 360° representation of the angle $\theta$. This general type of meter is well known and forms no part of the instant invention. A meter of this type is shown in Eaton Patents 1,842,343 and 1,842,347 and may be utilized if connected in the manner shown in Figure 6. This meter is a three coil meter constructed with meter windings 86, 88 and 90 arranged to produce magnetic fields 120 degrees removed from one another. Such a meter can be utilized as a two-phase meter if two of the coils, such as 88 and 90, are utilized in series to produce a resultant magnetic field which is 90° removed from the magnetic field produced by the coil 86. Thus, if terminals 82 and 84 are connected to terminals 92 and 94, and terminals 78 and 80 connected to terminals 96 and 98, the rotor of the meter shown in Figure 6 rotates through 360° to provide an accurate representation of the angle $\theta$ between the aircraft heading and the station to which the unit is tuned.

This system is found to be more advantageous than the three loop system disclosed in the assignee's copending application Serial No. 685,486 filed September 23, 1957, now abandoned, in that it is generally found in three loop systems that the 90° phase shift necessary in introducing the sense signal detracts from the stability of the unit. With the two loop system of this invention exactly 90° of phase shift is not necessary, so that this particular sensitivity and instability encountered in three loop systems is eliminated. According to the system of the present invention, the sense signal must be introduced at a phase angle with respect to the RF loop signals which is greater than 0° and equal to or less than 90°. Such a signal can be quite effectively derived in a very economical manner through the use of an RC circuit wherein it is simple to achieve substantially a 90° phase shift without the possibility of the phase shift ever exceeding 90°. An additional advantage of this system is the possibility of an even smaller loop than is achieved with a three loop system plus the fact that the noise introduced by the modulation system can be filtered from the audio. The particular phase detection system disclosed is thought to provide a simple, economical and quite accurate phase presentation which inherently filters and rejects signals of a frequency other than the modulation frequency. While the particular embodiment of the invention described herein illustrates the sense signal as being injected through a 90° phase shift to the output of the balanced modulators, it will be apparent to those skilled in the art that a 90° phase shift could be provided between the loops and the balanced modulators, in which event the sense signal can be mixed with the output of the modulators without the use of a phase shift network.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. A radio direction finding system comprising a pair of antennas disposed at 90 degrees from one another and adapted to provide RF signals, means for modulating said signals derived from said antennas with low frequency signals 90° apart in phase, said modulation being effected in such a manner as to suppress the carriers, demodulation means receiving said modulated signals in addition to a signal from an omnidirectional sense antenna, a phase detector receiving the output from said demodulator and comparing it with the phase of at least one of said low frequency modulating signals, said phase detector comprising commutator means for deriving a pair of signals from said demodulated signal obtained by sampling each cycle of said demodulated signal for a period of 180° per cycle, said pair of derived signals differing in phase by 90°, and phase indicating means controlled by said phase detector to provide a phase indication.

2. A radio direction finding system as set out in claim 1 wherein the signals used to modulate said RF signals are derived from a generator mechanically coupled to a mechanical commutator and synchronized therewith.

3. A radio direction finding system comprising a pair of loop antennas having their axes at 90° from one another and connected to supply signals to a pair of balanced modulators, modulating means modulating said signals with low frequency modulation voltages of the same frequency but 90° apart in phase, an omnidirectional antenna, a detector comprising a superheterodyne receiver including first and second detectors, said omnidirectional antenna being connected so that a signal therefrom is mixed with said earlier mentioned signals and all signals are connected to said detector, a phase detector receiving an input from the second detector of said superheterodyne receiver, said phase detector comprising commutator means for deriving a pair of signals from said demodulated signal obtained by sampling each cycle of said demodulated signal for a period of 180° per cycle, said pair of derived signals differing in phase by 90°, and phase indicating means controlled by said phase detector to provide a phase indication.

4. A radio direction finder as set out in claim 3 wherein the voltages used to modulate the signals from said loop antennas are derived from a generator mechanically coupled to a mechanical commutator and synchronized therewith.

References Cited in the file of this patent
UNITED STATES PATENTS

| | | |
|---|---|---|
| 1,839,290 | Bailey | Jan. 5, 1932 |
| 2,274,546 | Hugenholtz | Feb. 24, 1942 |
| 2,449,553 | Hansel | Sept. 21, 1948 |